United States Patent [19]

Dessauer et al.

[11] Patent Number: 4,857,110

[45] Date of Patent: Aug. 15, 1989

[54] AGENT FOR IMPROVING THE PRINTABILITY OF PAPER AND BOARD

[76] Inventors: Guido Dessauer; Helmut Berenbold, both of Hoechst Aktiengesellschaft, P.O. Box 80 03 20, D-6230 Frankfurt am Main 80, Fed. Rep. of Germany

[21] Appl. No.: 106,562

[22] Filed: Oct. 6, 1987

[30] Foreign Application Priority Data

Oct. 8, 1986 [DE] Fed. Rep. of Germany ....... 3634277

[51] Int. Cl.[4] .......... C08L 3/00

[52] U.S. Cl. .......... 106/211; 106/131; 106/176; 106/178; 106/186; 106/199; 106/206; 106/212; 106/213; 524/94; 524/100; 524/236

[58] Field of Search .......... 106/186, 176, 213, 206, 106/27, 211, 178, 131, 211, 199; 524/94, 100, 236

[56] References Cited

U.S. PATENT DOCUMENTS

| | | | |
|---|---|---|---|
| 2,514,131 | 7/1950 | Kaszuba | 106/186 |
| 2,666,038 | 1/1954 | Eisen | 106/206 |
| 4,707,189 | 11/1987 | Nickol | 106/186 |

*Primary Examiner*—Theodore Morris

[57] ABSTRACT

An agent for improving the printability of paper and board, essentially comprising
50 to 95% by weight of water, and
5 to 50% by weight of a mixture of
I. 1 to 50% by weight of
(a) an organic quaternary ammonium salt having at least one $C_8$–$C_{22}$-alkyl group,
(b) a mixture of 50 to 99.5% by weight of an organic quaternary ammonium salt and 0.5 to 50% by weight of a saturated or unsaturated $C_8$–$C_{22}$-fatty acid, an oxidized wax or a polyglycol having a molecular weight of greater than 4,000, or
(c) a mixture of 50 to 99.5% by weight of an organic amine which has been partly neutralized using a mineral acid or a lower carboxylic acid, and 0.5 to 50% by weight of a saturated or unsaturated $C_8$–$C_{33}$-fatty acid, an oxidized wax or a polyglycol having a molecular weight of greater than 4,000, and
II. 50 to 99% by weight of a water-soluble or water-swellable polymer containing anionic groups.

In the case of printing papers which are treated with this agent preferably by coating, a reduction in strike-through and show-through of printing ink becomes especially apparent.

9 Claims, No Drawings

AGENT FOR IMPROVING THE PRINTABILITY OF PAPER AND BOARD

DESCRIPTION

An agent for improving the printability of paper and board.

The invention has the object of treating paper and board in a such fashion that all types of systems which contain an organic solvent, for example the printing ink, coating composition or a lacquer dispersed or dissolved in an organic solvent, in particular a low-viscosity gravure ink, penetrate as little as possible into or through the paper or board. The less these inks penetrate, the less is the consumption and the more pleasant is the print gloss of the treated surface. In addition, the depth of color increases. This problem of penetration of the printing ink into the paper is pronounced in all printing processes, but particularly in gravure processes, since gravure inks, compared with other printing inks (relief printing and offset printing), must have a substantially lower viscosity. Gravure printing is one of the most widespread types of printing for mass printed matter of all types. For economic and postal reasons, there has been a tendency for years to reduce the basis weights of such papers. This wish is limited, in particular, in the case of coated gravure paper, but also in the case of natural gravure paper.

In order to have a good holdout of the gravure ink on the paper surface, the coating must have a minimum thickness of about 6.5–7 $g/m^2$ per side in the case of the coated types, and, at a total weight of 50 $g/m^2$, a raw coating paper of about 36 $g/m^2$ results from this in the case of gravure paper coated on both sides. In today's point of view, this is a lower limit, since it is only the fibers of the raw coating paper which contribute to the physical strength values of the printing paper.

On the other hand, uncoated natural gravure papers are equal to coated gravure papers neither in the whiteness nor in the gloss of the printed material which can be produced. The consumption of gravure ink, particularly, is of the order of about $2\frac{1}{2}$- to 3-fold that of coated papers since the porosity, and thus the absorbency, of natural gravure papers is substantially greater. Accordingly, strike-through and show-through of the print on the rear is a particular problem in these papers when the basis weight is further reduced.

Although it was possible to close the surface of uncoated natural gravure papers to a certain extent through the use, described in European Pat. No. 0,017,793, of hydratable, film-forming, colloidal clays, and to improve the printability, the gravure papers thus treated are not yet comparable to coated gravure papers, even only approximately, in the ink absorption. However, use of the hydrated, film-forming clays described in European Pat. No. 0,017,793 in coating compositions or as a surface coating is impossible for rheological reasons.

It has now been found that the printing properties, particularly the gravure and roll offset printing properties of paper, in particular of bible papers, but also of board, can be considerably improved if the paper or the board is bulk-treated or surface-treated with a mixture which essentially comprises an aqueous dispersion or suspension of organic quaternary ammonium salts and polymers containing anionic groups.

The invention relates to an agent for improving the printability of paper and board as a consequence of a reduction in penetration of all systems which contain organic solvents, oils and other low- to medium-viscosity organic compounds. This agent essentially comprises 50 to 95% by weight of water and
5 to 50% by weight of a mixture comprising
I. 1 to 50% by weight of
(a) an organic quaternary ammonium salt containing at least one $C_8$–$C_{22}$-alkyl group,
(b) a mixture of 50 to 99.5% by weight of an organic quaternary ammonium salt and a 0.5 to 50% by weight of a saturated or unsaturated $C_8$–$C_{22}$-fatty acid, an oxidized wax or a polyglycol having a molecular weight of greater than 4,000 or
(c) a mixture of 50 to 99.5% by weight of an organic amine which has been partly neutralized using a mineral acid or a lower carboxylic acid, and 0.5 to 50% by weight of a saturated or unsaturated $C_8$–$C_{22}$-fatty acid, an oxidized wax or a polyglycol having a molecular weight of greater than 4,000 and
II. 50 to 99% by weight of a water-soluble or water-swellable polymer containing anionic groups.

Suitable organic quaternary ammonium salts are, in particular, those of the following formulae (1) to (8)

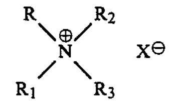 (1)

in which R denotes $C_8$–$C_{22}$-alkyl, $C_8$–$C_{22}$-alkenyl or a group of the formula —(A—O)$_y$—$C_8$–$C_{22}$-alkyl, $R_1$ denotes $C_1$–$C_4$-alkyl or benzyl, $R_2$ denotes hydrogen, $C_1$–$C_{22}$-alkyl, $C_1$–$C_{22}$-alkenyl or a group of the formula —(A—O)$_y$—B or of the formula —(A—O)$_y$—$C_8$–$C_{22}$-alkyl, $R_3$ denotes hydrogen, $C_1$–$C_4$-alkyl or a group of the formula —(A—O)$_y$—B, A denotes $C_1$–$C_4$-alkylene, B denotes hydrogen or a group of the formula —COR, y denotes a number from 1 to 25, and X denotes an anion;

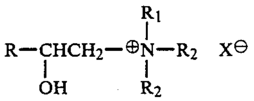 (2)

in which X, R, $R_1$ and $R_2$ have the abovementioned meanings;

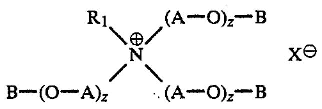 (3)

in which z in each case denotes a number from 1 to 10, and X, $R_1$, A and B have the abovementioned meanings;

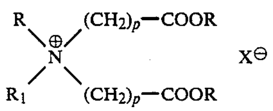 (4)

in which p denotes 1 or 2, and X, R and $R_1$ have the abovementioned meanings;

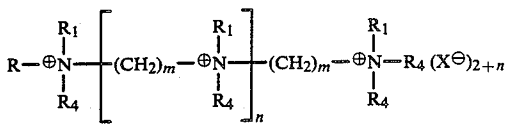

(5)

in which the groups $R_4$ may be identical or different and denote hydrogen, $C_1$–$C_4$-alkyl, benzyl or a gorup of the formula —(A—O)$_z$—B, m denotes 2 or 3, and n denotes 0 or 1, and X, R, $R_1$, A, B and z have the abovementioned meanings;

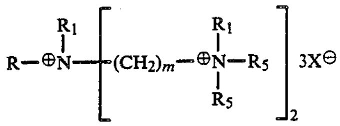

(6)

in which $R_5$ denotes hydrogen, $C_1$–$C_4$-alkyl or benzyl and X, R, $R_1$ and m have the abovementioned meanings;

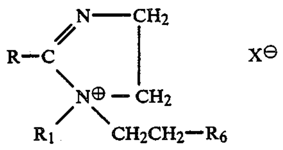

(7)

in which $R_6$ denotes OH, $NH_2$ or a group of the formula —OCOR or —NHCOR, and X, R and $R_1$ have the abovementioned meanings;

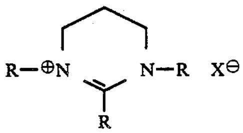

(8)

in which X, R and $R_1$ have the abovementioned meanings.

Suitable organic amines in component I(c) are those amines on which the quaternary ammonium salts listed above are based. These amines have the following formulae (1') to (8'), the individual substituents having the same meaning as in the formulae (1) to (8)

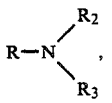

(1')

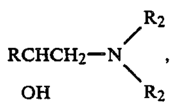

(2')

$N—[(A—O)_z—B]_3$, (3')

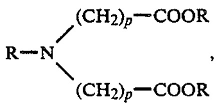

(4')

-continued

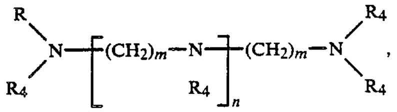

(5')

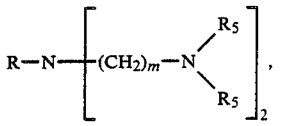

(6')

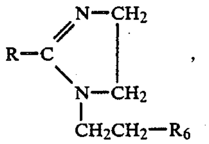

(7')

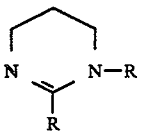

(8')

Of all compounds in component I(a), the compounds of the formula I are preferred. Likewise preferred are the partly neutralized amines of the formula 1', mixed with $C_{12}$–$C_{18}$-fatty acids as component I(c). In the compounds of the formulae 1 to 8 and 1' to 8', the following groups are preferred: R=$C_{12}$–$C_{18}$-alkyl or $C_{12}$–$C_{18}$-alkenyl, $R_1$=methyl or ethyl, $R_2$=methyl, ethyl, $C_{12}$–$C_{18}$-alkyl or $C_{12}$–$C_{18}$-alkenyl, A=$C_2H_4$ or $C_3H_6$ and n=1 or 2. If substituents comprise $C_8$–$C_{22}$-alkyl or $C_8$–$C_{22}$-alkenyl groups, suitable groups are, in particular, those which are derived from natural fatty acids, such as tallow oil fatty acid, coconut fatty acid, oleic acid, palmitic acid and stearic acid, and mixtures thereof. Suitable anions are, for example, chloride, bromide, sulfate, methylsulfate, dimethylphosphate, phosphate or anions of organic acids, such as acetic acid, propionic acid, trichloroacetic acid, lactic acid, citric acid, tartaric acid, tartronic acid, oxalic acid and malonic acid.

The agent according to the invention preferably contains 15 to 25% by weight of the sum of the two components I and II. The preferred amount ratios of the two components I and II with one another are 5 to 15% by weight for component I and, correspondingly, 85 to 95% by weight for component II. Component I(b) preferably comprises 70% by weight of the quaternary ammonium salt and 30% by weight of the other component(s). The same amount ratio is preferred in the case of component I(c). For the partial neutralization of the organic amines in component I(c), 0.05 to 0.5 mole, preferably 0.1 mole, of an acid are used per mole of organic amine. Suitable acids for this purpose are the mineral acids and organic carboxylic acids which are usually customary. In component I(c), it has proven expedient to also use a nonionic emulsifier. Various mixtures of the individual components can also be used in place of only one of components Ia, b or c.

Suitable polymers (component II) are, for example, polysaccharide derivatives containing anionic groups, such as, for example, carboxymethylcellulose, carboxymethylstarch, carboxymethylguar, xanthene, or synthetic polymers containing anionic or polar groups, such as, for example, polyacrylates, anionic polyacrylamides, copolymers of acrylic acid and maleic anhydride, styrene and maleic anhydride or styrene and acrylic acid, or also polyvinyl alcohols and polyvinyl acetates. However, oxidized starch is preferred. These polymers can also be replaced to an amount of 70% by weight by the white pigments conventionally used in paper manufacture, such as titanium dioxide, kaolin and calcium carbonate. The agent claimed is prepared by simply stirring the original batches of the components required.

The agent according to the invention can be added to the mixer or proportioning system during the paper manufacture, in an amount from 2 to 8, preferably 5 to 7, % by weight, relative to the finished paper. The addition can also take place, in particular, to the filler slurry by initially stirring the polymer into the filler slurry and then adding the organic quaternary ammonium compound. This mixture is then added to the pulp. In addition, it is also possible to apply the agent according to the invention to the paper in a coating composition.

However, the agent according to the invention is preferably applied to the surface of the raw paper. This is carried out before calendering with the aid of suitable apparatuses. If the paper machine is set up appropriately, the agent according to the invention can also be applied in the dry part of the machine. The surface is dried after application. The application rates in the case of application to the surface are generally 0.1 to 10 $g/m^2$, preferably 0.6 to 3 $g/m^2$.

The agent according to the invention is suitable for treatment of all types of papers, as required in gravure printing, roll offset printing, sheet offset printing and relief printing. The agent according to the invention is particularly interesting for gravure and roll offset papers. For gravure printing, two types of paper are essentially suitable, namely high-filler, satinized, usually woody gravure paper in basis weights between 40 and about 80 $g/m^2$ (SC paper) and coated, woody or wood-free, highly satinized gravure paper in basis weights between 45 and about 135 $g/m^2$. Roll offset printing usually uses woody, uncoated or coated, so-called LWC papers having basis weights between 40 and 80 $g/m^2$. For sheet offset printing, both woody and wood-free papers having basis weights of 60 $g/m^2$ and more and having sized or coated surfaces are generally employed. The compounds according to the invention are also of interest for treatment of paper for relief printing (book printing and newspaper printing). In this case, it is of importance, above all, that papers which are treated with the agent according to the invention require less ink during printing.

The organic groups in the quaternary ammonium salts and amines, through absorption of the organic solvent or mineral oil contained in the printing inks, prevent further penetration of the printing ink, and thus strike-through to the rear of the paper. At the same time, the affinity of the printing ink to the paper is improved. The use of the polymer, such as, for example, oxidized starch, is necessary since the quaternary organic ammonium salts alone exert a plasticizing action on the paper fibers and thus considerably reduce the breaking length of the paper. This undesired effect of the quaternary ammonium compound is suppressed through salt formation between the quaternary ammonium compmound and the polymer.

The plasticizing effect, and thus the reduction in the break length, does not appear.

The advantages which are achieved using the agent according to the invention on printing papers can be described as follows: reduction in strike-through and show-through, increase in depth of color and in blackness, reduced ink consumption, increase in print gloss, reduction in the number of missing dots, and increase in conductivity. In the case of roll offset printing, an improvement in pick resistance also became apparent. Through the reduction in ink consumption, deinking of a paper treated with an agent according to the invention and subsequently printed is also simplified. The fiber stock obtained on deinking has a markedly better whiteness. With the agent described, advantages also arise in carbonless copy papers which use microcapsules. The problem of all these capsule papers is that about half the capsule contents liberated are sucked back into the donor sheet and do not contribute at all to the color reaction. Through treatment of the paper with the agent according to the invention, this reabsorption of the capsule contents is reduced and the transfer factor is considerably increased.

In the case of board, which is frequently lacquered over after printing, the lacquer consumption is reduced through coating with the agent according to the invention.

EXAMPLES

The compounds specified in the following table were stirred together in the amounts specified in the form of their aqueous stock solutions, dispersions or suspensions. The mixtures obtained were pasty and exhibited, in the cases where kaolin was present, a pronounced pseudoplastic flow behavior. A natural printing paper (40 $g/m^2$) was coated using these mixtures.

| | Example | | | | | | |
|---|---|---|---|---|---|---|---|
| | 1 | 2 | 3 | 4 | 5 | 6 | 7 |
| Starting materials | Amounts in (g) | | | | | | |
| Demineralized water | 820.0 | 820.0 | 818.5 | 817.5 | 818.1 | 820.0 | 820.0 |
| Distearyldimethyl-ammonium chloride | 20.0 | | 19.5 | | 9.8 | 13.0 | 45.0 |
| Stearic acid | | 6.0 | | 6.0 | 3.0 | 6.5 | |
| Stearylamine | | 12.0 | | 12.0 | 6.0 | | |
| Oxidized starch | 162.0 | 162.0 | 54.0 | 54.0 | 54.0 | 54.0 | 91.0 |
| Carboxymethyl-hydroxyethyl-cellulose | | | | | | | 45.0 |
| Kaolin | | | 108.0 | 108.0 | 108.0 | 108.0 | |
| Hydrochloric acid (37% strength) | | 0.45 | | 0.45 | 0.23 | | |
| Nonionic emulsifier | | 2.0 | | 2.0 | 1.0 | | |

The following characteristic values were achieved on trial printing using these coating compositions.

| | without coating | Example 1 | 2 | 3 | 4 | 5 | 6 | 7 |
|---|---|---|---|---|---|---|---|---|
| Application rate, $g/m^2$ | — | 2.90 | 3.01 | 2.92 | 2.86 | 3.39 | 2.59 | 3.88 |
| Ink density, % | 1.61 | 2.04 | 1.89 | 2.01 | 2.07 | 2.02 | 2.05 | 1.84 |
| Strike-through | 20.6 | 3.7 | 5.6 | 5.3 | 9.5 | 8.2 | 8.5 | 7.5 |
| Gloss | 2.23 | 3.83 | 2.38 | 2.23 | 3.67 | 3.43 | 3.95 | 2.60 |

-continued

| | without coating | Example 1 | 2 | 3 | 4 | 5 | 6 | 7 |
|---|---|---|---|---|---|---|---|---|
| (Lehmann) | | | | | | | | |

These values, in particular the values for strike-through, show that a very considerable improvement in printability of paper can be achieved using the agents according to the present invention.

We claim:

1. An agent for improving the printability of paper and board, consisting essentially of
50 to 95% by weight of water, and
5 to 50% by weight of a mixture of
I. 1 to 50% by weight of
(a) an organic quaternary ammonium salt having at least one $C_8$-$C_{22}$-alkyl group,
(b) a mixture of 50 to 99.5% by weight of an organic quaternary ammonium salt and 0.5 to 50% by weight of a saturated or unsaturated $C_8$-$C_{22}$-fatty acid, an oxidized wax or a polyglycol having a molecular weight of greater than 4,000 or
(c) a mixture of 50 to 99.5% by weight of an organic amine which has been partly neutralized using a mineral acid or a lower carboxylic acid, and 0.5 to 50% by weight of a saturated or unsaturated $C_8$-$C_{22}$-fatty acid, an oxidized wax or a polyglycol having a molecular weight of greater than 4,000 and
II. 50 to 99% by weight of a water-soluble or water-swellable polymer containing anionic groups.

2. An agent as claimed in claim 1, wherein the organic quaternary ammonium salt is a compound of the formulae (1) to (8)

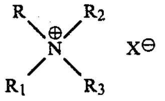 (1)

in which R denotes $C_8$-$C_{22}$-alkyl, $C_8$-$C_{22}$-alkenyl or a group of the formula $-(A-O)_y-C_8$-$C_{22}$-alkyl, $R_1$ denotes $C_1$-$C_4$-alkyl or benzyl, $R_2$ denotes hydrogen, $C_1$-$C_{22}$-alkyl, alkenyl or a group of the formula $-(A-O)_y-B$ or of the formula $-(A-O)_y-C_8$-$C_{22}$-alkyl, $R_3$ denotes hydrogen, $C_1$-$C_4$ alkyl or a group of the formula $-(A-O)y-B$, A denotes $C_1$-$C_4$-alkylene, B denotes hydrogen or a group of the formula $-COR$, y denotes a number from 1 to 25, and X denotes an anion;

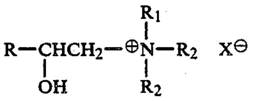 (2)

in which X, R, $R_1$ and $R_2$ have the above mentioned meanings;

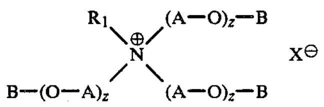 (3)

in which z in each case denotes a number from 1 to 10, and X, $R_1$, A and B have the abovementioned meanings;

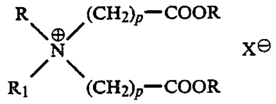 (4)

in which p denotes 1 or 2, and X, R and $R_1$ have the abovementioned meanings;

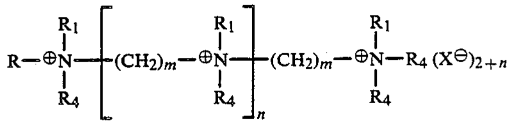 (5)

in which the groups $R_4$ may be identical or different and denote hydrogen, $C_1$-$C_4$-alkyl, benzyl or a group of the formula $-(A-O)_z-B$, m denotes 2 or 3, and n denotes 0 or 1, and X, R, $R_1$, A, B and z have the abovementioned meanings;

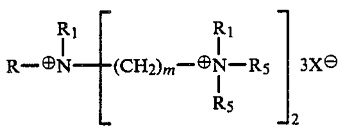 (6)

in which $R_5$ denotes hydrogen, $C_1$-$C_4$-alkyl or benzyl and X, R, $R_1$ and m have the abovementioned meanings;

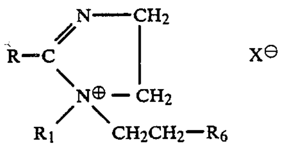 (7)

in which $R_6$ denotes OH, $NH_2$ or a group of the formulae $-OCOR$ or $-NHCOR$, and X, R and $R_1$ have the abovementioned meanings;

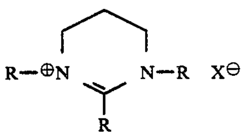 (8)

in which X, R and $R_1$ have the abovementioned meanings.

3. An agent as claimed in claim 1, wherein the organic amine is a compound of the formulae (1') to (8')

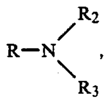 (1')

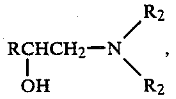 (2')

-continued $N-[(A-O)_z-B]_3$, (3')

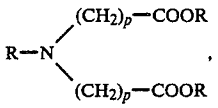

(4')

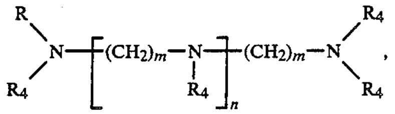

(5')

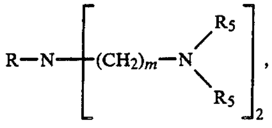

(6')

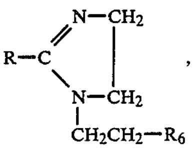

(7')

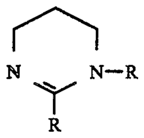

(8')

4. An agent as claimed in claim 1, wherein component I is distearyldimethylammonium chloride.

5. An agent as claimed in claim 1, wherein component I comprises a mixture of partly neutralized stearylamine and stearic acid.

6. An agent as claimed in claim 1, wherein component I consists essentially of a quaternary ammonium salt of the formula

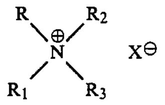

(1)

in which R denotes $C_8$–$C_{22}$-alkyl, $C_8$–$C_{22}$-alkenyl or a group of the formula $-(A-O)_y-C_8$–$C_{22}$-alkyl, $R_1$ denotes $C_1$–$C_4$-alkyl or benzyl, $R_2$ denotes hydrogen, $C_1$–$C_{22}$-alkyl, alkenyl or a group of the formula $-(A-O)_y-B$ of the formula $-(A-O)_y-C_8$–$C_{22}$-alkyl, $R_3$ denotes hydrogen, $C_1$–$C_4$ alkyl or a group of the formula $-(A-O)y-B$, A denotes $C_1$–$C_4$-alkylene, B denotes hydrogen or a group of the formula —COR, y denotes a number from 1 to 25, and X denotes an anion;

and component II consists essentially of a polysaccharide derivative containing anionic groups.

7. An agent as claimed in claim 6, wherein the polysaccharide derivative is oxidized starch.

8. An agent as claimed in claim 1, wherein component I consists essentially of a mixture of a said organic amine, which has been partly neutralized, and a said $C_8$–$C_{22}$ fatty acid.

9. An agent as claimed in claim 8, wherein component II consists essentially of oxidized starch.

* * * * *